United States Patent [19]

Buschkamp

[11] 3,941,913

[45] Mar. 2, 1976

[54] COAXIAL HIGH FREQUENCY CABLE

[75] Inventor: Heinz Buschkamp, Hannover, Germany

[73] Assignee: Kabel-und Metallwerke Gutehoffnungshutte Aktiengesellschaft, Germany

[22] Filed: July 31, 1974

[21] Appl. No.: 493,249

[30] Foreign Application Priority Data

Aug. 16, 1973 Germany ........................... 2341386

[52] U.S. Cl. ..................... 174/23 R; 156/56; 174/28

[51] Int. Cl.$^{2}$ ................... H01B 11/18; H02G 15/20

[58] Field of Search ............. 174/28, 29, 111, 23 R; 156/54, 55, 56

[56] References Cited

UNITED STATES PATENTS

| | | | |
|---|---|---|---|
| 3,660,589 | 5/1972 | Jachimowicz et al. | 174/28 |

FOREIGN PATENTS OR APPLICATIONS

| | | | |
|---|---|---|---|
| 835,291 | 12/1938 | France | 174/28 |
| 737,081 | 7/1943 | Germany | 174/28 |

*Primary Examiner*—Arthur T. Grimley
*Attorney, Agent, or Firm*—Marn & Jangarathis

[57] ABSTRACT

High frequency coaxial cable is provided with spacers bonded to both the inner and outer conductor through thin layers of bonding material. A bonding material is applied to the inner conductor and the spacer bonded thereto. A bonding material is then applied to the spacer and/or outer conductor, and the outer conductor is bonded to the spacer.

10 Claims, 5 Drawing Figures

COAXIAL HIGH FREQUENCY CABLE

The present invention relates to coaxial high frequency cable, and more particularly to coaxial cables formed of an inner and an outer conductor which are held in concentric position by distance spacers, with the distance spacers being bonded to each of the two conductors.

The German laid open Pat. No. 2,120,699 describes the production of coaxial cable in which the spacers are bonded to the conductors. The bonding of the distance spacers with the two conductors is carried out to assure that the radially water tight cables do not permit a leaking of water in the longitudinal direction, because at the connecting points, this could lead to shorts between the two conductors. The known method satisfies the mechanical problem, however, the electrical properties of the high frequency cable is unfavorably influenced. In accordance with the known method, the distance spacers, which are made of copolymer material in the shape of disks, are mounted on the inner conductor at certain intervals, and are bonded together with the inner conductor as well as with the outer conductor. However, the use of such material for the spacers increases the phase angle for the high frequency cable, so that the attenuation is substantially increased which impedes the transmission of the high frequency energy.

The principle object of this invention is to provide coaxial cables which are watertight in the longitudinal direction, without impeding the electrical properties of the high frequency cable.

In accordance with the present invention, there is provided a coaxial cable comprised of an inner conductor, an outer conductor and at least one spacer between the inner and outer conductor and bonded to the inner conductor by a first thin layer of bonding material and to the outer conductor by a second thin layer of bonding material.

In accordance with the present invention, a coaxial cable comprised of an inner conductor, an outer conductor and at least one spacer between the inner and outer conductor and bonded thereto is produced by forming a first coating of bonding material on the inner conductor, followed by mounting of the distance spacer on the coated portion and bonding of the distance spacer to the inner conductor through the first coating. A second coating of bonding material is formed on the outer conductor and/or the portion of the spacer to be bonded to the inner conductor, and the outer conductor placed around the inner conductor and in engagement with the spacer, followed by bonding the spacer to the outer conductor through the second coating of bonding material.

By proceeding in accordance with the present invention, commonly used materials which provide good electrical properties for the cable, may be used for the distance spacers, without concern as to whether such materials can be bonded to the conductors in that the spacers are bonded to the conductors through the intermediate bonding layers. The coat of bonding material for bonding the spacer to the inner and the outer conductor may be very thin, since only a bonding between the distance spacers and the two conductors is intended. whereby the distance spacers may have any suitable configuration. The present invention will be further described with respect to the attached drawings wherein:

Figure 1:
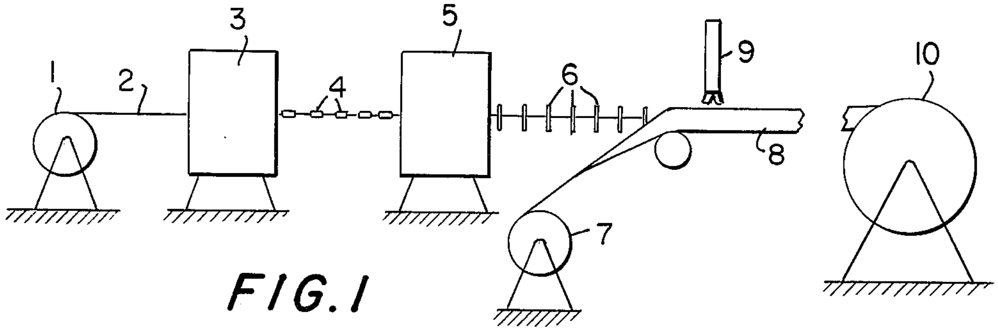
FIG. 1 is a simplified schematic representation of a device for producing coaxial cable in accordance with the invention.
Figure 2:
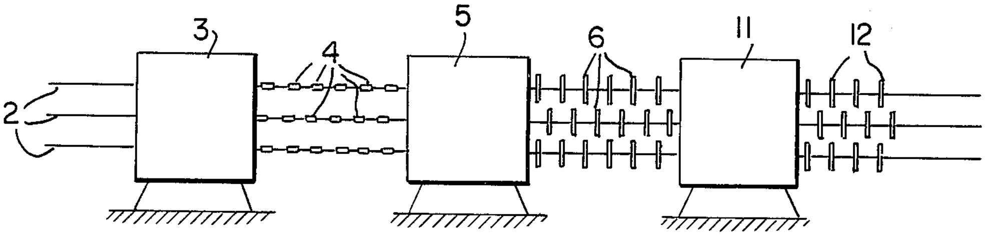
FIG. 2 is a simplified schematic representation of another device for producing coaxial cable in accordance with the invention.
Figure 4:
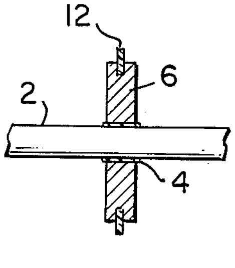
FIG. 4 is a cross sectional view, in enlarged scale, of an inner conductor having a spacer bonded thereto.

Referring to FIG. 1, an inner conductor of a coaxial high frequency cable, which, for example, may be a copper wire, is drawn off from drum 1, and is guided to an injection molding device 3, wherein the inner conductor 2 is provided with a coating of bonding material such as an ethylene copolymer, in the form of molded rings 4 at discrete places, as shown. After leaving injection molding device 3, the inner conductor is guided to a further injection molding device 5, wherein the distance spacers 6 are injection molded onto the inner conductor at the places where the bonding material 4 had been placed and are bonded to the inner conductor through bonding material 4. The distance spacers 6 are formed of a common isolating materials, for example, polyethylene. Subsequently, a metal strip is drawn from drum 7 around the inner conductor 2, and in engagement with the spaced disks 6, so as to form an outer conductor 8. The butt-jointed ends of the outer conductor are welded together in a longitudinal seam by means of a welding apparatus 9. The metal strip from which the outer conductor 8 is formed may also be made of copper and is provided with a coat of bonding material, so that the outer conductor may be bonded during the welding process or in an additional heating process with disks 6. After the outer conductor 8 has been manufactured, the finished high frequency cable may be wound onto a drum 10. In present techniques, where the distance spacers are in the shape of a disk, it is common that a large number of inner conductors are introduced into the injection molding device and are provided with the disks. Such a device is shown in FIG. 2, for example, wherein three inner conductors 2 are introduced into injection molding device 3 and wherein the bonding rings 4 are provided. All three inner conductors are simultaneously provided with the distance spacer disks 6 in injection molding apparatus 5 which are bonded to the inner conductor by the bonding material. The outer disks 6, are then provided with a coating of bonding material, e.g., a copolymer of ethylene in the form of molded rings 12, in injection molding apparatus 11. The inner conductor, including the bonded spacer disks 6 and outer ring of bonding material 12 is shown, in cross section, in FIG. 4.

Figure 5:
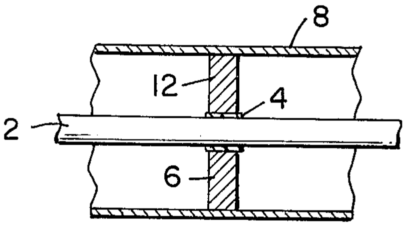
FIG. 5 is a cross sectional view, in enlarged scale, of an embodiment of a coaxial cable of the present invention.

In accordance with the embodiment where the spacer is provided with bonding material, coating of the outer conductor with bonding material is not required; however, as should be apparent, the outer conductor, if desired, can be provided with bonding material. The outer conductor is then placed around the inner conductor (not shown), and the outer conductor is bonded to the disks 6 (not shown); for example, by heating to liquefy ring 12 whereby the outer conductor 8 snugly engages disks 6, whereby the ring of bonding material spreads evenly on the outer circumference of disk 6. The coaxial cable with a disk bonded to the inner and outer conductor is shown, in cross section, in FIG. 5.

Figure 3:
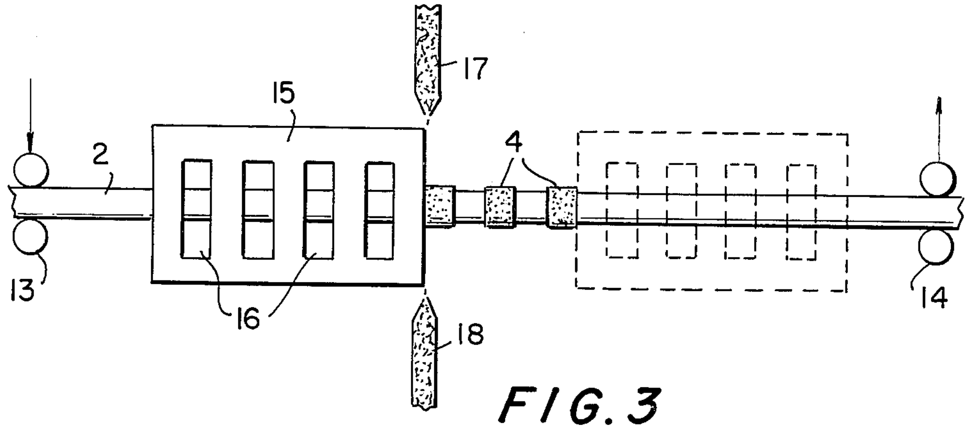
FIG. 3 is a simplified schematic representation of a further device for producing coaxial cable in accordance with the invention.

The coating of the inner conductor with bonding material rings 4 may be carried out in conjunction with FIG. 3. In this case, a heating of the inner conductor is carried out, for example, by means of current over the pair of rollers 13 and 14 in the range of the injection molding apparatus 3. In the apparatus the inner conductor 2 runs through a masking cover 15 having recesses 16 which correspond to the width of bonding material ring 4. Furthermore, two nozzles 17 and 18 are provided in the apparatus which are displaced by about 180° with respect to each other and which supply the fine-grained bonding material onto cover 15. In the range of the injection molding apparatus cover 15 is moved together with the inner conductor, so that the cover assumes the final position as indicated by the dotted lines. Since the injection molding of the disks onto the inner conductor permits only a step-by-step operation there is enough time to return the cover 15 to its initial position while the disks are molded onto the inner conductor.

Although, the above disclosed method relates to distance spacers in the shape of disk it should be understood that any other suitable distance spacers which can provide a water-tight seal in the longitudinal direction may be used; for example, a foamed or solid insulation which completely fills the space between the inner, and outer conductor. Accordingly, the present invention is not limited to the spacer particularly shown.

Numerous modifications and variations of the present invention are possible in light of the above teachings and, therefore, within the scope of the appended claims, the invention may be practiced than as particularly described.

What is claimed is:

1. A process for producing a coaxial high frequency cable, formed of an inner conductor, an outer conductor, and a spacer between the inner conductor and outer conductor, which is bonded thereto, comprising:

applying a first bonding material in the form of at least one molded ring on the inner conductor;

mounting at least one distance spacer on the at least one molded ring;

bonding the at least one spacer to the inner conductor by the at least one molded ring of bonding material;

applying a second bonding material on at least one of the inner surface of the outer conductor and the portion of the at least one spacer to be bonded to the outer conductor;

placing the outer conductor around the inner conductor and in engagement with the at least one spacer; and bonding the at least one spacer to the outer conductor by the second bonding material.

2. The process of claim 1 wherein a plurality of distance spacers are employed in the coaxial cable, and the first and second bonding material are applied only at the points where the spacers are bonded to the inner and outer conductors.

3. The process of claim 2 wherein the second bonding material is in the form of molded rings of bonding material on the distance spacers.

4. The process of claim 3 wherein the molded rings for the inner conductor are provided in an injection molding apparatus with the bonding material being applied to the inner conductor through apertures in a masking cover for the inner conductor which moves through the injection molding apparatus simultaneously with the inner conductor.

5. The process of claim 3 wherein the distance spacer is in the form of a disk.

6. The process of claim 3 wherein the distance spacers are molded onto the inner conductor at the points on the inner conductor containing the first coating of bonding material in the form of molded rings.

7. The process of claim 1 wherein the second bonding material is applied to the outer conductor.

8. A high frequency coaxial cable comprising:

an inner conductor;

an outer conductor concentric with the inner conductor and spaced therefrom, at least one spacer between the inner and outer conductor, said spacer being bonded to the inner conductor by a molded ring of bonding material and to the outer conductor by a layer of bonding material to provide a water-tight seal.

9. The coaxial cable of claim 8 wherein the coaxial cable includes a plurality of distance spacers spaced along the length of the cable, said spacers being in the form of disks, each bonded to the inner conductor by a molded ring of bonding material.

10. The coaxial cable of claim 8 wherein the spacers are bonded to the outer conductor by a layer of bonding material formed from a molded ring of bonding material on the spacers.

* * * * *